United States Patent [19]

Murray et al.

[11] 4,360,610

[45] Nov. 23, 1982

[54] METHOD OF IMPROVING SILICONE RUBBER COMPOSITION

[75] Inventors: Milton C. Murray, Bay City; Joan M. Donatelli, Midland, both of Mich.

[73] Assignee: Dow Corning Corporation, Midland, Mich.

[21] Appl. No.: 246,348

[22] Filed: Mar. 23, 1981

[51] Int. Cl.$^3$ .................. C08K 3/36; C08L 83/06
[52] U.S. Cl. ........................ 523/212; 523/209; 523/210; 524/492; 524/493; 524/588; 525/477
[58] Field of Search .................. 260/37 SB; 523/209, 523/212, 210; 524/492, 493

[56] References Cited

U.S. PATENT DOCUMENTS 2,890,188  6/1959  Konkle et al. .................. 260/29.1
3,268,473  8/1966  Brown .................................. 260/37
3,696,068 10/1972  Creamer ........................ 260/29.1 B
4,052,357 10/1977  Marinik ............................ 260/37 SB Primary Examiner—Wilbert J. Briggs, Sr.
Attorney, Agent, or Firm—Roger H. Borrousch

[57] ABSTRACT

A new method of producing a silicone rubber composition yields a unique composition. When the composition is further mixed with extending filler and vulcanized, the tensile strength of the vulcanized silicone rubber is improved over that obtained when the composition is not produced following the method of this invention. The method mixes polydiorganosiloxane gum, treated reinforcing silica filler, a portion of hydroxylated organosilicon compound having an average of from 1 to 20 percent by weight hydroxyl radicals and an average of from 1 to 31 percent by weight vinyl radicals; heating the mixture; then cooling and admixing another portion of the hydroxylated organosilicon compound.

21 Claims, No Drawings

METHOD OF IMPROVING SILICONE RUBBER COMPOSITION

BACKGROUND OF THE INVENTION

1. Field of the Invention

This invention is related to a method of producing improved silicone rubber compositions. The method yields a product having improved physical properties, particularly tensile strength, when extended with filler.

2. Description of the Prior Art

It is known that siloxane compounds containing hydroxyl groups may be useful additives when added to silicone rubber compositions. U.S. Pat. No. 2,890,188, issued June 9, 1959, to Konkle, McHard, and Polmanteer, teaches that the crepe-hardening of a silicone composition containing an organopolysiloxane and a silica filler having a high surface area could be prevented by adding a hydroxylated organosilane.

U.S. Pat. No. 3,268,473, issued Aug. 23, 1966, to Brown teaches a method of preparing a stable organosiloxane mixture which involves heating a mixture of an organosilicon polymer, a filler, an organosilicon compound containing silicon-bonded hydroxyl radicals and a salt selected from a group consisting of ammonium carbonate and ammonium bicarbonate.

Creamer, in U.S. Pat. No. 3,696,068, issued Oct. 3, 1972, discloses a heat curable silicone gumstock composition comprising 100 parts by weight of diorganopolysiloxane gum containing from about 0.01 to about 1.0 weight percent of vinyl siloxy units and from about 0.5 to about 5 parts by weight of a linear vinyl containing dihydrocarbon siloxane copolymer fluid having endblocking siloxy units of the formula $R_3SiO_{0.5}$. In his Examples, he mixes a polydimethylsiloxane gumstock containing vinyl radical, silica filler, and linear hydroxy terminated dimethylsiloxane oil on a mill. He then hot mills the mixture after it has aged 24 hours at room temperature. After cooling, he mixes the material with a linear vinyl containing dihydrocarbon siloxane copolymer fluid having triorganosiloxy endblocking and a catalyst. The cured rubber has a unique combination of low compression set and high tear strength.

Marinik, in U.S. Pat. No. 4,052,357, issued Oct. 4, 1977, teaches a method of making a silicone rubber composition which provides a combination of high modulus and high tear strength. His method consists essentially of mixing polydiorganosiloxane gum, reinforcing silica filler, hydroxylated diorganosilicon compound having from 10 to 50 percent phenyl radicals and from 2 to 20 percent vinyl radicals, and fiberized blast furnace slag, then heating the mixture. The product can then be catalyzed with vinyl specific organic peroxide and cured into silicone rubber.

SUMMARY OF THE INVENTION

This invention relates to a particular method of manufacturing a silicone rubber composition which can then be mixed with extending filler. The cured, extended silicone rubber has a higher tensile strength after vulcanization than it would possess if the method of this invention was not followed.

Mixing two increments of a hydroxylated organosilicon compound containing vinyl radical into a mixture of polydiorganosiloxane gum and treated reinforcing filler, one increment before a heating step and one increment after the heating step, results in a unique composition. When the composition is further mixed with extending filler and catalyst and then vulcanized, the tensile strength of the vulcanized silicone rubber is higher than if the method of this invention was not used. The improved tensile strength is obtained without post-curing the vulcanized silicone rubber.

DESCRIPTION OF THE INVENTION

This invention relates to a method of producing a silicone rubber composition comprising (I) mixing (A) 100 parts by weight of polydiorganosiloxane gum having a viscosity of greater than 1000 Pa.s at 25° C., wherein the organic radicals are selected from the group consisting of methyl, phenyl, vinyl, and 3,3,3-trifluoropropyl, at least 50 percent of the organic radicals being methyl and less than 2 percent being vinyl, (B) from 10 to 85 parts by weight of treated silica reinforcing filler having a surface area of greater than 50 m²/g, (C) from 0.1 to 5 parts by weight of a hydroxylated organosilicon compound having the average unit formula

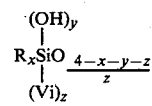

in which R is methyl, phenyl or 3,3,3-trifluoropropyl, Vi is vinyl, x has a value from 1.0 to 2.0 inclusive, y has a value such that there is present an average of from 1 to 20 percent by weight hydroxyl radical, z has a value such that there is present an average of from 1 to 31 percent by weight vinyl radical, and the compound is soluble in (A); then (II) heating the mixture to a temperature of from 60° to 250° C. for a period of from 10 minutes to 10 days to provide a product that is stable upon storage, and then (III) cooling the mixture to room temperature and admixing during the cooling process when the temperature of the mixture is below 125° C. or after room temperature has been reached from 0.1 to 2.5 parts by weight of the hydroxylated organosilicon compound of (C) and from 1 to 250 parts by weight of extending filler with a surface area of less than 50 m²/g.

Silicone rubber compositions that can be vulcanized by heating to yield an elastomer are well known in the art. Some of these compositions are such that they can be mixed with extending fillers to change the property profile and to lower the cost. When a silicone rubber composition is mixed with extending filler and vulcanized, there is normally a lowering of the tensile strength. One method known to recover at least a portion of the loss is a further post-cure of the rubber in addition to the cure during vulcanization. The additional cure is another step in the process and adds cost to the final product. The method of this invention is a new process which yields a product having the ability to be mixed with extending fillers. Such a product can be vulcanized to give a silicone rubber having improved tensile strength, compared to a similar product not manufactured using the new method. It is not necessary to post-cure the cured product of this invention to obtain the improved tensile strength.

The polydiorganosiloxane gums (A) used in this invention are well known in the art. The gums are repeating diorganosiloxane units, such as dimethylsiloxane units, phenylmethylsiloxane units, diphenylsiloxane units, methylvinylsiloxane units, and 3,3,3-trifluoropropylmethylsiloxane units. Within the scope of polydiorganosiloxane gum, other units such as monoorganosiloxane units and SiO₂ units can be present to provide some polymer branching, but only in trace quantities. The polydiorganosiloxane gums can be terminated with hydroxyl radicals or triorganosiloxy units, such as trimethylsiloxy units, dimethylvinylsiloxy units, and phenylmethylvinylsiloxy units. The gums have viscosities at 25° C. greater than 1000 Pa.s and preferably greater than 5,000 Pa.s. At least 50 percent of the organic radicals are methyl radicals and no more than 2 percent of the organic radicals are vinyl radicals. The preferred polydiorganosiloxane gum is a polydimethylsiloxane gum containing vinyl radical.

The reinforcing silica fillers (B) used in this invention are those known in the art as useful for reinforcing silicone rubber. The preferred fillers consist of siliceous particles having a surface area of greater than 50 m²/g obtainable as fume silicas, precipitated silicas, and silica aerogels. The preferred silicas are the fume silicas and precipitated silicas having surface areas greater than 100 m²/g. The reinforcing silica is treated to prevent the interaction between the silica and the polydiorganosiloxane gum known as crepe-hardening. The treated reinforcing silica filler can be pre-treated or treated in situ during the manufacture of the mixture. Pre-treated reinforcing silica fillers can be treated by any one of the conventional methods described in the prior art, wherein the treating agents include organosilanes, organosiloxanes, and silazanes. Methods of preparing treated reinforcing silica are disclosed in U.S. Pat. No. 3,122,516, issued Feb. 25, 1969, to Polmanteer; U.S. Pat. No. 3,334,062, issued Aug. 1, 1967, to Brown and Hyde; U.S. Pat. No. 3,635,743, issued Jan. 18, 1972, to Smith; and U.S. Pat. No. 3,624,023, issued Nov. 30, 1977, to Hartage, which are hereby incorporated by reference to show the preparation of treated reinforcing silica fillers. The amount of treated reinforcing silica filler can vary from 10 to 85 parts by weight based upon 100 parts by weight of the polydiorganosiloxane gum. The preferred amount of reinforcing silica filler varies from 20 to 60 parts by weight.

If the reinforcing filler is not treated as described above, it is necessary to treat the reinforcing silica in situ during mixing step (I), yielding a treated reinforcing silica filler. The reinforcing silica can be treated in situ by adding anticrepe hardening agents during step (I). Useful anticrepe hardening agents are well known in the art. They include silanes, silazanes, and low molecular weight siloxanes. Short chain siloxanes, typically endblocked with hydroxyl or alkoxy groups so that they may react with the hydroxyl groups present on the surface of the reinforcing filler, are often used. The organic radicals present in the anticrepe hardening agents can be methyl, phenyl, or 3,3,3-trifluoropropyl. The amount of anticrepe hardening agent used is somewhat dependent upon the particular anticrepe hardening agent chosen and the kind and amount of reinforcing filler used. As more reinforcing filler is used, more anticrepe hardening agent is needed. The more surface area present in the reinforcing filler, the more anticrepe hardening agent needed. The methods of determining the correct combinations of anticrepe hardening agent and reinforcing filler are known in the art. When a hydroxyl endblocked polydiorganosiloxane fluid is used as an anticrepe hardening agent, the amount varies from 1 to 20 parts by weight based upon 100 parts by weight of the polydiorganosiloxane gum. Such hydroxyl endblocked polydiorganosiloxane fluids preferably have a viscosity of less than 1.0 Pa.s at 25° C., with the organic radicals selected from methyl and phenyl radicals.

The method of this invention requires a hydroxylated organosilicon compound (C), containing vinyl radicals, to be added during the steps of the method at two distinct points. The hydroxylated organosilicon compounds useful in this invention are not new; the method of using them, to produce an unexpectedly superior result, is the basis of this invention.

The hydroxylated organosilicon compound (C) useful in this invention has the formula

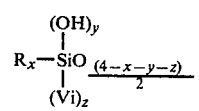

in which R is methyl, phenyl or 3,3,3-trifluoropropyl, Vi is vinyl, x has a value from 1.0 to 2.0 inclusive, y has a value such that there is present an average of from 1 to 20 percent by weight hydroxyl radical, z has a value such that there is present an average of from 1 to 31 percent by weight vinyl radical, and the compound is soluble in (A). The compound of (C) can be low molecular weight fluids or resins. To assure that (C) is well distributed throughout the mix, it should be soluble in (A). The compound of (C) can be a linear or branched siloxanol or a hydroxyl containing siloxane resin. It can be a single material or a mixture of materials.

A preferred hydroxylated compound of (C) is a hydroxyl endblocked polydiorganosiloxane having a viscosity of less than 0.5 Pa.s at 25° C. The organo radicals are chosen from methyl, vinyl, phenyl, and 3,3,3-trifluoropropyl to provide the required amounts of vinyl. The hydroxyl endblocked polydiorganosiloxanes can be manufactured by the well known methods of hydrolyzing the appropriate chlorosilanes and recovering the product.

The hydroxyl containing siloxane resins can be manufactured by the well known methods of hydrolyzing the appropriate chlorosilanes in solvent. The solvent is removed to yield a low molecular weight product which can be mixed into the silicone rubber composition. The starting chlorosilanes are selected from mixtures of monoorganotrichlorosilane, diorganodichlorosilane, or triorganomonochlorosilane.

The value and uniqueness of the composition produced by the method of this invention becomes apparent when the composition contains an extending filler. Extending fillers for the purpose of this invention are those fillers having a surface area of less than 50 m²/g which are useful in extending silicone rubber. It is felt that the extending fillers most suitable for this invention are those which have hydroxyl groups on their surface such as siliceous materials. Finely ground quartz, diatomacious earth, and clays are particularly useful as they are readily obtainable and are low in cost.

The physical properties of the cured silicone rubber are effected by the choice and amount of extending filler used in the composition. Ordinarily, as more extending filler is added, the durometer rises, the tensile strength decreases, and the elongation decreases. The magnitude of such effects, are dependent upon the type of extending filler and the characteristics of the silicone rubber mixture.

The method of this invention produces a silicone rubber composition which is unique. When extending filler is added, as discussed above, the lowering of tensile strength does not occur. As much as 250 parts of extending filler can be added per 100 parts of polydiorganosiloxane gum without significant loss of tensile strength. Preferred amounts of extending filler are from 20 parts by weight, necessary to significantly lower the cost of the composition, to 150 parts by weight. The useful upper limit of the amount of extending filler is determined by noting the amount where the elongation of the composition has decreased to a point where the rubber will no longer serve the required purpose. The most preferred amount and kind of extending filler depends upon the requirements of the end use of the silicone rubber.

The compositions of this invention are vulcanized by any of the well known methods of vulcanizing silicone rubber. The preferred method is through the use of an organic peroxide vulcanizing agent suitable for vulcanizing the polydiorganosiloxane gum. If the polydiorganosiloxane gum does not include any vinyl radicals, it must be vulcanized with organic peroxides that are efficient in causing reactions in such polydiorganosiloxanes. Such organic peroxides are labeled "non-vinyl specific" and are represented by such organic peroxides as benzoylperoxide, dicumylperoxide, and 2,4-dichlorobenzoylperoxide. If the polydiorganosiloxane contains vinyl radicals, it can be vulcanized with either "non-vinyl specific" or "vinyl specific" organic peroxides. Representative of the vinyl specific organic peroxides are ditertiary-butylperoxide and 2,5-bis(tert-butylperoxy)-2,5-dimethylhexane. All these organic peroxide vulcanizing agents and their properties are well known in the art. The properties of the cured silicone rubber can be altered by the type and amount of vulcanizing agent used to cure the composition. Typical changes due to such choices are well recognized in the art. The organic peroxide vulcanizing agent can be present in amounts from 0.1 to 5 parts by weight per 100 parts by weight of the polydiorganosiloxane gum, preferably from 0.5 to 2.0 parts by weight. The preferred vinyl specific catalyst is 2,5-bis(tert-butylperoxy)-2,5-dimethylhexane.

The composition produced by the method of this invention can also contain minor amounts of additives as commonly used in silicone rubber to improve the heat stability, handling, compression set, oil resistance, flame resistance, etc. A particular additive which has been found useful in an additive to improve the adhesion of the composition to a substrate it is vulcanized against as shown in German Offenlegungsschrift No. 2,934,203, published Mar. 6, 1980. The adhesion additive consists of an acryloxyalkylsilane of the formula

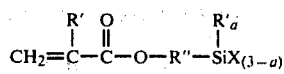

in which R' is selected from the group consisting of hydrogen and methyl radical, R" is alkylene radical of from 1 to 4 inclusive carbon atoms, X is a radical from the group consisting of lower alkoxy radicals of from 1 to 3 inclusive carbon atoms and acetoxy radical, and a is from 0 to 2 inclusive. The adhesive additive is useful in amounts of from greater than 0.1 to 1.5 parts by weight of the acryloxyalkylsilane per 100 parts of polydiorganosiloxane gum. These acryloxyalkylsilanes are known in the art. They are disclosed in U.S. Pat. No. 3,567,497, issued Mar. 2, 1971 by Plueddemann and Clark which is hereby incorporated by reference to further describe the silanes and their method of manufacture. The preferred gamma-methacryloxypropyltrimethoxysilane is commercially available.

The method of this invention comprises as step (I), mixing polydiorganosiloxane gum, (A), treated reinforcing filler, (B), and hydroxylated organosilicon compound, (C). Step (I) can be carried out in a mixer conventionally used in silicone rubber manufacture, such as, a dough mixer, Banbury mixer, or a 2-roll mill. The ingredients can be mixed in any order, but the preferred method is to add (A) to the mixer first, other additives such as plasticizers, pigments, or heat stability additives, and then (B). If (B) is to be treated in situ, it is necessary to add anticrepe hardening agents before the silica addition, or in conjunction with it, so that the anticrepe hardening agent is available to react with the silica surface as it is added to the mixture. A preferred method is to mix (A), additives, and anticrepe hardening agent. After these are dispersed, (B) is added in increments mixing each increment sufficiently to distribute (B) throughout the mixture before the next increment is added. After all (B) is added and has been mixed sufficiently to distribute it uniformly throughout the mixture, (C) is added. The amount of (C) is from 0.1 to 5 parts by weight with the preferred amount from 0.25 to 1.5 part by weight based upon 100 parts by weight of polydiorganosiloxane gum. The silicone rubber composition manufactured using this preferred order of addition in step (I) has a higher tensile strength when mixed with extending filler and cured.

The mixture resulting from the mixing step, (I), is then heated to a temperature of from 60° C. to 250° C. for a period of from 10 minutes to 10 days. This heating step, (II), allows a reaction between the ingredients to take place so that the product is stable upon storage. The time required is dependent upon the temperature, with lower temperatures requiring longer times. This reaction can also be accelerated by the addition of materials such as from 0.01 to 2 parts by weight of ammonium carbonate, or ammonium bicarbonate as taught by Brown in U.S. Pat. No. 3,268,473, issued Aug. 23, 1966 which is hereby incorporated to further describe the heating step and its effects. Ammonia can also be used in the same amounts. When accelerated, step (II) is preferably at a temperature of from 100° C. to 175° C. for a period of from 10 minutes to 4 hours.

Mixing is preferably continued through heating step (II) to aid in heat transfer. Since low volatility polydiorganosiloxanes may be present at this time, it is customary to draw a partial vacuum on the mixer if it is sealed, as well as introduce an inert gas into the space above the mixing composition to eliminate any chance of the volatile materials collecting and possibly igniting or exploding.

After the heating step, (II), the mixture is cooled to a temperature below 125° C. in step (III) and then an additional amount of (C) is added. If the mixture has been heated to a temperature above the flash point or boiling point of the hydroxylated organosilicon compound, the mixture should be cooled below this temperature before the addition is made. The addition can be made immediately after cooling or it may be made at a later time. A convenient time for the addition is immediately upon cooling while the mixture is still in the mixing equipment. The mixture can be stored at this point and then later mixed with extending filler and vulcanizing agent. Alternatively, the mixture at the end of step (III) can be stored, then the admixing of the second amount of organosilicon compound can be done at the time of admixing the extending filler. The organic peroxide vulcanizing agent is preferably added as the last step since it is a temperature sensitive material and the temperature of the mixture must be controlled at this point.

If acryloxyalkylsilane adhesion additive is desirable in the composition, it can be added at any time after cooling step (III).

The silicone rubber compositions of this invention can be cured by any suitable means. Heating the composition containing organic peroxide vulcanizing agent is the preferred method. The time and temperature necessary to cause vulcanization of the composition are dependent upon the organic peroxide vulcanizing agent chosen, the method of heating, the method of shaping the composition to a desired configuration and the thickness of the finished part. The temperature that is appropriate for a given set of conditions is well known in the silicone rubber art. Typical temperatures are from 110° C. to 175° C. for molding operations and as high as 350° C. for ovens used in continuous hot air vulcanization operations.

The compositions can be shaped to a desired configuration by well known methods of forming elastomeric curable compositions, such as, press molding, injection molding, calendering, and extruding, both supported and unsupported.

The method of this invention produces a composition having improved tensile strength when compared to the same composition produced in previously known method. The improved compositions are useful for making elastomeric articles suitable for uses customarily known for silicone rubber such as molded parts for high temperature applications, gaskets, O rings, diaphragms, tubing and insulated electrical wiring.

The following examples are included for illustrative purposes only and should not be construed as limiting the invention which is properly delineated by the appended claims. All parts are parts by weight. The physical properties of test sheets were determined in accordance with the procedures described in ASTM-D412 for tensile strength and elongation and by ASTM-D2240 for durometer, Shore A scale.

EXAMPLE 1

A silicone rubber composition was made following the method of this invention.

A "base" was made by mixing in a dough mixer, 70 parts of dimethylvinylsiloxy endblocked polydiorganosiloxane gum (Gum A) having, as a percentage of organic radicals in the gum, 99.85 percent methyl radicals and 0.15 percent vinyl radicals, 30 parts of hydroxyl endblocked polydimethylsiloxane gum (Gum B), 3 parts of hydroxyl endblocked polydimethylsiloxane fluid (Fluid A) having a viscosity of about 0.04 Pa.s at 25° C. and about 3.25 weight percent hydroxyl radical, 5 parts of hydroxy endblocked polymethylphenylsiloxane fluid (Fluid B) having a viscosity of about 0.5 Pa.s at 25° C. and about 4.5 weight percent hydroxyl radical, 0.5 part of a hydroxyl endblocked polydiorganosiloxane (Compound A) having methyl and vinyl radicals with about 16 weight percent hydroxyl radical and about 10 weight percent vinyl radical, 29 parts of reinforcing silica having a surface area of about 250 m$^2$/g and 0.05 part of ammonium carbonate. The mixture was heated for approximately 1 hour at about 150° C. in the mixer and then cooled and removed. At this point the mixture is referred to as "base".

Portions of the above base, consisting of 100 parts, were then mixed on a two roll rubber mill with 60 parts of ground quartz extending filler having an average particle size of 10 micrometers, parts of Compound A shown in Table I, parts of a handling additive, consisting of a mixture of 90% by weight Gum A and 10% by weight boric acid, shown in Table I, and 0.6 part of 2,5-bis(tert-butylperoxy)-2,5-dimethylhexane catalyst.

The silicone rubber compositions resulting were then press molded for 10 minutes at 170° C. The test results are shown in Table I.

The test results show that the base, extended with ground quartz, has a significantly higher tensile strength when the hydroxyl endblocked polydiorganosiloxane having methyl and vinyl radicals, Compound A, was added to the composition after the heating step. It is known from previous experience that the presence or absence of the handling additive does not cause such a change in tensile strength.

This experiment was repeated using a different batch of Compound A, as well, different batches of base with similar results in all cases.

TABLE I

|  | A* | B | C |
|---|---|---|---|
| Composition |  |  |  |
| Base | 100 | 100 | 100 |
| Extending filler | 60 | 60 | 60 |
| Compound A | 0 | 0.35 | 0.5 |
| Handling additive | 0 | 0.5 | 0.5 |
| Catalyst | 0.6 | 0.6 | 0.6 |
| Properties after pressing and vulcanizing |  |  |  |
| Durometer, Shore A | 58 | 59 | 60 |
| Tensile Strength, MPa | 5.03 | 7.30 | 7.37 |
| Elongation, percent | 425 | 275 | 260 |

*Outside scope of invention

EXAMPLE 2

A series of compositions were made to determine if the increase in tensile strength of the extended cured silicone rubber is due to the amount of hydroxyl endblocked polydiorganosiloxane containing vinyl radicals or the method in which it is added.

A series of bases were prepared by mixing, following the procedure of Example 1, 25 parts of Gum A, 75 parts of a dimethylvinylsiloxy endblocked polydimethylsiloxane gum (Gum C), 6 parts of the Fluid A, 45 parts of precipitated reinforcing silica filler having a surface area of about 150 m$^2$/g, parts of Compound A shown in Table II, and 0.05 part of ammonium carbonate.

Portions of each of the above bases were then further compounded by mixing on a two roll mill using 150 parts of base, 150 parts of the ground quartz of Example 1, 1.5 parts of the peroxide catalyst of Example 1, 1.5 parts of the peroxide catalyst of Example 1, 1.5 parts of the handling additive of Example 1 and parts of Compound A shown in Table II.

Tests were performed on sheets molded as in Example 1.

Compositions A, D, and G illustrate that hydroxyl endblocked polydiorganosiloxane having vinyl radical added to the composition only during the production of the base does not yield a composition which can be extended with extending filler and which can obtain tensile strength equal to that obtained when the method of this invention is followed.

Compositions B and D contain a total of 0.5 part of Compound A. Composition B, having Compound A added both during the manufacture of the base and during the manufacture of the final composition, has much improved tensile strength when compared to composition D. Compositions C, E, and G have a total of 0.75 part of Compound A. Compositions C and E, using the method of this invention, have improved tensile strength when compared to composition G. Compositions F and H have a total of 1.0 part of Compound A, both using the method of this invention. Both have satisfactory tensile strength.

parts of the reinforcing silica of Example 2, 0.5 part of Compound B, and 0.05 part of ammonium carbonate.

A portion of the base then had 0.25 part of additional Compound B added to 146 parts of base on a two roll mill. The mixtures were then further compounded with ground quartz extending filler as shown in Table IV and 1 part of the catalyst of Example 1, each based upon 100 parts of base.

The composition were molded into test sheets and tested as in Example 1.

A comparison of compositions A and C illustrates that the addition of hydroxyl endblocked polymethylvinylsiloxane to the base does not significantly effect the physical properties when no extending filler is pres-

TABLE II

|  | A* | B | C | D* | E | F | G* | H | I |
|---|---|---|---|---|---|---|---|---|---|
| Composition |  |  |  |  |  |  |  |  |  |
| Compound A, parts used in making base | 0.25 | 0.25 | 0.25 | 0.50 | 0.50 | 0.50 | 0.75 | 0.75 | 0.75 |
| Compound A, parts added to 150 pts. base | 0 | 0.25 | 0.50 | 0 | 0.25 | 0.50 | 0 | 0.25 | 0.50 |
| Properties after vulcanization |  |  |  |  |  |  |  |  |  |
| Durometer, Shore A | 72 | 72 | 73 | 72 | 74 | 75 | 73 | 74 | 75 |
| Tensile Strength, MPa | 3.79 | 6.34 | 6.75 | 4.27 | 6.48 | 6.48 | 4.55 | 6.34 | 6.96 |
| Elongation, percent | 320 | 210 | 170 | 255 | 200 | 180 | 215 | 190 | 180 |

*Outside scope of invention

EXAMPLE 3

A different hydroxyl endblocked polydiorganosiloxane was evaluated as the hydroxylated organosilicon compound.

The polydiorganosiloxane used in this experiment was a hydroxyl endblocked polymethylvinyl siloxane having a viscosity of about 0.04 Pa.s at 25° C., about 3.2 weight percent hydroxyl radicals and about 30 weight percent vinyl radicals, (Compound B).

The compositions of Example 2 were repeated using the amounts of the above described Compound B as shown in Table III in place of the Compound A used in Example 2. The compositions were molded into test sheets as in Example 1.

A comparison of the test results shown in Table III again illustrates the uniqueness of the method of this invention. Compositions A and E are outside the method of this invention. Compositions B, C, and D, when compared to composition A, illustrate the increase in tensile strength obtained by following the method of this invention. Compositions F, G, and H, when compared to composition E show the same effect.

ent. Composition B illustrates that when extending filler was added to a base without the hydroxyl endblocked polymethylvinylsiloxane also being added, the tensile strength decreases. Composition D illustrates that when the hydroxyl endblocked polymethylvinylsiloxane was added in addition to the extending filler, according to the method of this invention, the tensile strength was improved even over that obtained in the original base.

TABLE IV

|  | A* | B* | C | D |
|---|---|---|---|---|
| Composition |  |  |  |  |
| Compound B added to 100 pts. base, parts | 0 | 0 | 0.17 | 0.17 |
| Ground quartz, parts | 0 | 100 | 0 | 100 |
| Properties after vulcanization |  |  |  |  |
| Durometer, Shore A | 49 | 70 | 50 | 73 |
| Tensile Strength, MPa | 6.55 | 5.79 | 6.20 | 7.03 |
| Elongation, percent | 475 | 230 | 440 | 175 |

*Outside scope of invention

EXAMPLE 5

The compositions of Example 4 were repeated with the substitution of Compound A for the Compound B

TABLE III

|  | A* | B | C | D | E* | F | G | H |
|---|---|---|---|---|---|---|---|---|
| Composition |  |  |  |  |  |  |  |  |
| Compound B, parts used in making base | 0.50 | 0.50 | 0.50 | 0.50 | 1.0 | 1.0 | 1.0 | 1.0 |
| Compound B, parts added to 150 pts. base | 0 | 0.25 | 0.50 | 0.75 | 0 | 0.25 | 0.50 | 0.75 |
| Properties after vulcanization |  |  |  |  |  |  |  |  |
| Durometer, Shore A | 75 | 77 | 79 | 79 | 79 | 80 | 80 | 82 |
| Tensile Strength, MPa | 5.72 | 7.79 | 7.58 | 7.65 | 6.82 | 7.44 | 7.30 | 7.51 |
| Elongation, percent | 170 | 150 | 135 | 130 | 135 | 130 | 115 | 110 |

*Outside scope of invention

EXAMPLE 4

A base was prepared as in Example 3, using 25 parts of Gum A, 75 parts of Gum C, 6 parts of Fluid A, 40 used in Example 4. The results were similar.

EXAMPLE 6

A different hydroxylated organosilicon compound was evaluated for usefulness in the method of this invention in place of the hydroxyl endblocked polydiorganosiloxane.

This hydroxylated organosilicon compound was a benzene soluble material having 37.5 mole percent monophenylsiloxane units, 30 mole percent dimethylsiloxane units, 20 mole percent methylvinylsiloxane units, 7.5 mole percent monomethylsiloxane units, and 5 mole percent trimethylsiloxane units. It had a vinyl radical content of about 5.3 weight percent and a hydroxyl radical content of about 2.3 weight percent, (Compound C).

A pair of bases were prepared by mixing, following the procedure of Example 1, 25 parts of Gum A, 75 parts of Gum C, 6 parts of Fluid A, 45 parts of the silica filler of Example 2, parts of Compound C shown in Table V, and 0.05 part of ammonium carbonate.

Each of the above bases were then further compounded by mixing on a two roll mill using 150 parts of base, 150 parts of the ground quartz of Example 1, 1.5 parts of the peroxide catalyst of Example 1, 1.5 parts of the handling additive of Example 1, and 0.5 part of Compound C. The compositions were molded and tested as in Example 1.

TABLE V

|  | A | B |
|---|---|---|
| Composition |  |  |
| Compound C, parts used in making base | 1.0 | 1.5 |
| Compound C, parts added to 150 pts. base | 0.5 | 0.5 |
| Properties after vulcanization |  |  |
| Durometer, Shore A | 77 | 74 |
| Tensile Strength, MPa | 5.37 | 5.79 |
| Elongation, percent | 235 | 195 |

This organosilicon compound is not as efficient as the Compound A used in Example 2 as shown by comparing the above results with those of Table II.

The use of a total of 1.5 and 2.0 parts of Compound C in this Example did not yield tensile strengths as high as those of Example 2 where the total amounts of Compound A used were from 0.5 to 1.25 parts.

Without any organosilicon compound, having both hydroxyl radicals and vinyl radicals, added after the preparation of the base, the tensile strength dropped significantly when extending filler was added. For comparative purposes, a base produced as in Example 2 using 0.5 parts of the Compound A gave a tensile strength of 6.34 MPa with no extending filler added. When 100 parts of ground quartz extending filler was added to 100 parts of the base, the tensile strength dropped to 4.41 MPa. The use of the organosilicon compound of this Example, Compound C, improved the tensile strength as shown above in Table V, but not to the level shown when using the Compound A as in Example 2.

EXAMPLE 7

The method of Example 1 was followed mixing 100 parts of Gum C, 2 parts of Fluid A, 4 parts of Fluid B, 45 parts of the precipitated reinforcing silica of Example 2, 0.5 part of Compound A, and 0.045 part of ammonium carbonate. After the heating and cooling steps, an additional 0.25 part of Compound A was added.

A portion of this mixture was mixed with 0.8 part of the catalyst of Example 1. Two additional portions were mixed with 0.1 part of catalyst and 0.2 part of black pigment paste with the addition of ground quartz extending filler of Example 1, 60 parts to one portion and 100 parts to the other portion. Each portion was molded and tested as in Example 1. The results are in Table VI.

TABLE VI

|  | A | B | C |
|---|---|---|---|
| Composition |  |  |  |
| Base, parts | 100 | 100 | 100 |
| ground quartz, parts | 0 | 60 | 100 |
| Properties after vulcanization |  |  |  |
| Durometer, Shore A | 46 | 60 | 71 |
| Tensile Strength, MPa | 8.34 | 7.17 | 6.89 |
| Elongation, percent | 620 | 320 | 210 |

EXAMPLE 8

A series of compositions were prepared using identical ingredients, but different orders of addition.

A series of bases were prepared by mixing 50 parts of Gum A, 50 parts of Gum B, 8 parts of Fluid B, 29 parts of the reinforcing silica of Example 1, 0.03 part of ammonium carbonate, and parts of Compound A shown below, all ingredients being the same as those described in Example 1.

In base "A" there was no Compound A added. In base "B" there was 0.5 part of Compound A added to the mixture of Gums A and B before the reinforcing silica was added. In base "C" there was 0.5 part of Compound A added to the mixture after the silica was added.

Portions of each base were then compounded by mixing 100 parts of base, 60 parts of the ground quartz of Example 1, 0.2 part of carbon black pigment paste, parts of Compound A shown in Table VII, and 0.6 part of the catalyst of Example 1.

Portions of each base were also compounded by mixing with 0.6 part of the catalyst.

The compositions were then molded and tested as in Example 1. The results are shown in Table VII.

These results show that those compositions made following the method of this invention, in which a part of the hydroxylated organosilicon compound was added during the production of the base and a part of the compound was added after the production of the base, have a higher tensile strength than those made of the same ingredients, but not following the method of this invention. A comparison of the compositions made from base B with those compositions made from base C shows that a preferred method of making the composition added the compound to the base mixture after the silica was added and mixed in.

TABLE VII

|  |  | Base | Composition F* | G | H | I |
|---|---|---|---|---|---|---|
| Compound A, part |  |  | 0 | 0.1 | 0.25 | 0.5 |
| Base |  |  |  |  |  |  |
| A*. | Durometer, Shore A | 28 | 45 | — | 47 | 47 |
|  | Tensile Strength, MPa | 7.75 | 5.44 | — | 6.48 | 6.37 |
|  | Elongation, percent | 840 | 750 | — | 520 | 500 |
| B. | Durometer, Shore A | 38 | 56 | 55 | 55 | 55 |
|  | Tensile Strength, MPa | 7.23 | 5.34 | 5.68 | 6.37 | 7.23 |
|  | Elongation, percent | 600 | 530 | 440 | 400 | 350 |
| C. | Durometer, Shore A | 37 | 52 | 50 | 50 | 52 |
|  | Tensile Strength, MPa | 7.75 | 6.37 | 6.41 | 7.06 | 7.75 |

TABLE VII-continued

|  | Base | Composition | | | |
|---|---|---|---|---|---|
|  |  | F* | G | H | I |
| Elongation, percent | 700 | 600 | 480 | 450 | 430 |

*Outside scope of invention

EXAMPLE 9

The use of an acryloxyalkylsilane adhesion additive as an ingredient was evaluated.

A base was prepared using the same procedure, ingredients, and amounts as in Example 4.

Portions of the base, 100 parts, were then mixed with 0.25 part of Compound B, 100 parts of the ground quartz extending filler of Example 1, 1 part of the catalyst of Example 1, and the parts of gamma-methacryloxypropyltrimethoxysilane shown in Table VIII to give a silicone rubber.

Adhesion test sample lay-ups were then prepared by stacking alternate layers of rubber and glass fabric together so that there were 3 layers of rubber and three layers of glass fabric. A sheet of polytetrafluoroethylene was placed between the center plies of rubber and glass fabric at one end. The lay-up was then pressed for 20 minutes at 170° C. to vulcanize the rubber. The sheet of polytetrafluoroethylene was removed and 25.4 mm wide strips were cut from the sample. The two loose ends were pulled apart in a testing machine to measure the force required to peel the layers apart at a rubber-glass fabric interface. The amount of force required and the method of failure are shown in Table VIII.

Cohesive failure was achieved at a level of 0.75 part of the gamma-methacryloxypropyltrimethoxysilane.

The above experiment was repeated using Compound A in place of the Compound B used above to obtain similar results.

TABLE VIII

| Composition | A | B | C | D |
|---|---|---|---|---|
| Adhesion additive, parts | 0 | 0.25 | 0.5 | 0.75 |
| Peel strength, kN/m | 0.26 | 0.30 | 0.44 | 1.84 |
| Failure mode | Adh. | Adh. | Adh. | Coh. |

Adh. = Adhesive
Coh. = Cohesive
kN/m = kiloNewton/meter

EXAMPLE 10

The effect of acryloxyalkylsilane adhesion additive on the physical properties of the composition was evaluated.

A composition was prepared as in the first part of Example 9 have the 0.75 part of Compound B added as two increments, the first consisting of 0.5 part added before the heating step and the second increment of 0.25 part added after the heating step.

This composition was then compounded on a two roll mill as shown in Table IX, using 100 parts of the composition. The ground quartz, black pigment paste, and catalyst were those described in the previous experiments. The compositions were molded and tested as in Example 1.

The adhesion additive does not change the physical properties of the cured composition but does cause the composition to adhere to a substrate when the composition is cured in contact with the substrate.

TABLE IX

|  | A | B | C |
|---|---|---|---|
| Composition |  |  |  |
| Ground quartz, parts | 0 | 100 | 100 |
| Black pigment paste, parts | 0 | 1.0 | 1.0 |
| Catalyst, part | 1.0 | 1.0 | 1.0 |
| Adhesion additive | 0 | 0 | 0.75 |
| Physical Properties as vulcanized |  |  |  |
| Durometer, Shore A | 55 | 79 | 79 |
| Tensile Strength, MPa | 6.75 | 7.23 | 7.37 |
| Elongation, percent | 440 | 165 | 165 |

That which is claimed is:

1. A method of producing a silicone rubber composition comprising
   (I) mixing
      (A) 100 parts by weight of polydiorganosiloxane gum having a viscosity of greater than 1000 Pa.s at 25° C., wherein the organic radicals are selected from the group consisting of methyl, phenyl, vinyl, and 3,3,3-trifluoropropyl, at least 50 percent of the organic radicals being methyl and less than 2 percent being vinyl,
      (B) from 10 to 85 parts by weight of treated reinforcing silica filler having a surface area of greater than 50 m²/g,
      (C) from 0.1 to 5 parts by weight of a hydroxylated organosilicon compound having the average unit formula

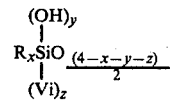

in which R is methyl, phenyl or 3,3,3-trifluoropropyl, Vi is vinyl, x has a value from 1.0 to 2.0 inclusive, y has a value such that there is present an average of from 1 to 20 percent by weight hydroxyl radical, z has a value such that there is present an average of from 1 to 31 percent by weight vinyl radical, and the compound is soluble in (A); then
   (II) heating the mixture to a temperature of from 60° to 250° C. for a period of from 10 minutes to 10 days to provide a product that is stable upon storage, and then
   (III) cooling the mixture to room temperature, and admixing during the cooling process when the temperature of the mixture is below 125° C. or after room temperature has been reached from 0.1 to 2.5 parts by weight of the hydroxylated organosilicon compound of (C) and from 1 to 250 parts by weight of extending filler with a surface area of less than 50 m²/g.

2. The method of claim 1 further comprising admixing from 0.1 to 5 parts by weight of organic peroxide vulcanizing agent suitable for vulcanizing the polydiorganosiloxane gum after the mixture is below the activation temperature of the organic peroxide.

3. The method of claim 1 in which (A), (B), and (C) of step (I) are combined by mixing (A) and (B) and thereafter admixing (C).

4. The method of claim 1 in which the polydiorganosiloxane gum of (A) contains vinyl radical.

5. The method of claim 1 in which the hydroxylated organosilicon compound of (C) is hydroxyl endblocked polymethylvinylsiloxane having a viscosity of less than 0.5 Pa.s at 25° C.

6. The method of claim 1 in which the extending filler is siliceous.

7. The method of claim 2 in which the hydroxylated organosilicon compound of (C) is hydroxyl endblocked polymethylvinylsiloxane having a viscosity of less than 0.5 Pa.s at 25° C.

8. The method of claim 1 further comprising admixing from greater than 0.1 to 1.5 parts by weight of an acryloxyalkylsilane of the formula

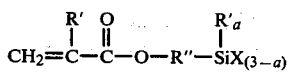
$$CH_2=\overset{R'}{\underset{|}{C}}-\overset{O}{\underset{\|}{C}}-O-R''-\underset{|}{Si}X_{(3-a)}R'_a$$

in which R' is selected from the group consisting of hydrogen and methyl radical, R'' is an alkylene radical of from 1 to 4 inclusive carbon atoms, X is a radical selected from the group consisting of lower alkoxy radicals of from 1 to 3 inclusive carbon atoms and acetoxy radical, and a is from 0 to 2 inclusive, after step (III).

9. A method of producing a silicone rubber composition comprising (I) mixing
  (A) 100 parts by weight of polydiorganosiloxane gum having a viscosity of greater than 100 Pa.s at 25° C., wherein the organic radicals are selected from the group consisting of methyl, phenyl, and vinyl, at least 78 percent of the organic radicals being methyl and less than 2 percent being vinyl, there being an average of at least two vinyl radicals per molecule on at least 25 percent by weight based on the total weight of polydiorganosiloxane gum present,
  (B) from 20 to 60 parts by weight of reinforcing silica filler having a surface area of greater than 50 m²/g,
  (B') from 1 to 20 parts by weight of hydroxyl endblocked polydiorganosiloxane fluid having a viscosity of less than 1.0 Pa.s at 25° C., the organic radicals being selected from the group consisting of methyl and phenyl, then
(I') admixing
  (C) from 0.1 to 5 parts by weight of a hydroxylated organosilicon compound having the average unit formula

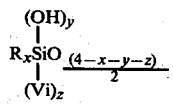
$$R_xSiO\underset{\underline{(4-x-y-z)}}{\overset{(OH)_y}{|}}_{(Vi)_z}$$

in which R is methyl or phenyl, Vi is vinyl, x has a value from 1.0 to 2.0 inclusive, y has a value such that there is present an average of from 1 to 20 percent by weight hydroxyl radical, z has a value such that there is present an average of from 1 to 31 percent by weight vinyl radical, and the compound is soluble in (A), and
  (D) from 0.01 to 2 parts by weight of a material selected from the group consisting of ammonium carbonate, ammonium bicarbonate, and ammonia, thereafter
(II) heating the mixture to a temperature of from 100° to 175° C. for a period of from 10 minutes to 4 hours to provide a product that is stable on storage, thereafter,
(III) cooling the mixture to room temperature and admixing during the cooling process when the temperature of the mixture is below 125° C. or after room temperature has been reached from 0.1 to 2.5 parts by weight of the hydroxylated organosilicon compound of (C) of step (I') and from 1 to 250 parts by weight of siliceous extending filler with a surface area of less than 50 m²/g, then
(IV) admixing from 0.1 to 5 parts by weight of organic peroxide vulcanizing agent suitable for vulcanizing the polydiorganosiloxane gum after the mixture is below the activation temperature of the organic peroxide.

10. The method of claim 9 in which the polydiorganosiloxane gum is polydimethylsiloxane.

11. The method of claim 9 in which the reinforcing silica filler is a precipitated silica having a surface area of greater than 100 m²/g.

12. The method of claim 9 in which the hydroxlyated organosilicon compound of (C) is hydroxyl endblocked polymethylvinylsiloxane having a viscosity of less than 0.5 Pa.s at 25° C.

13. The method of claim 11 in which the siliceous extending filler is selected from the group consisting of quartz, diatomaceous earth, and clay.

14. The method of claim 12 in which the organic peroxide vulcanizing agent is vinyl specific.

15. The method of claim 14 in which the vinyl specific organic peroxide is 2,5-bis(tert-butylperoxy)-2,5-dimethylhexane.

16. The method of claim 14 further comprising admixing from greater than 0.1 to 1.5 parts by weight of an acryloxyalkylsilane of the formula

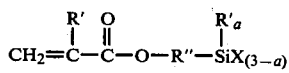
$$CH_2=\overset{R'}{\underset{|}{C}}-\overset{O}{\underset{\|}{C}}-O-R''-\underset{|}{Si}X_{(3-a)}R'_a$$

in which R' is selected from the group consisting of hydrogen and methyl radical, R'' is an alkylene radical of from 1 to 4 inclusive carbon atoms, X is a radical selected from the group consisting of lower alkoxy radicals of from 1 to 3 inclusive carbon atoms and acetoxy radical, and a is from 0 to 2 inclusive, after step (III).

17. A method of producing a cured silicone rubber elastomer comprising heating the silicone rubber composition of claim 2, 17, or 9 to a temperature sufficient to activate the vulcanizing agent.

18. A method of producing a cured silicone rubber comprising admixing from 0.1 to 5 parts by weight of organic peroxide vulcanizing agent suitable for vulcanizing the polydiorganosiloxane gum into the silicone rubber composition of claim 3, or 9 or 1, then heating to a temperature sufficient to activate the vulcanizing agent.

19. The method of claim 1 in which the extending filler is present in an amount of from 20 to 150 parts by weight.

20. The method of claim 9 in which the extending filler is present in an amount of from 20 to 150 parts by weight.

21. The product obtained by the method of claim 2, 3, 8, 16, 1, 9, 19, or 20.

* * * * *